Nov. 10, 1959
J. E. SHULTZ
2,912,639
MICROSYN AMPLIFIER
Filed Nov. 14, 1955
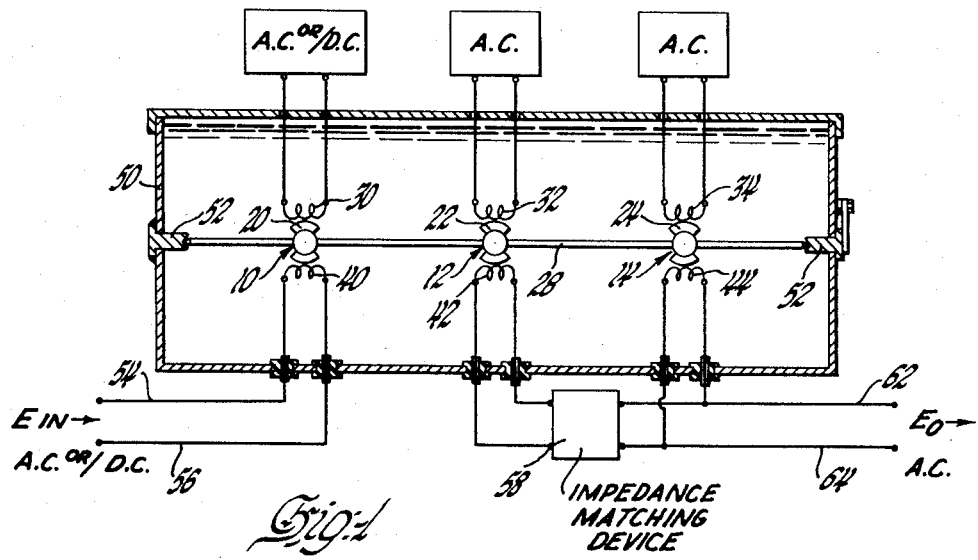
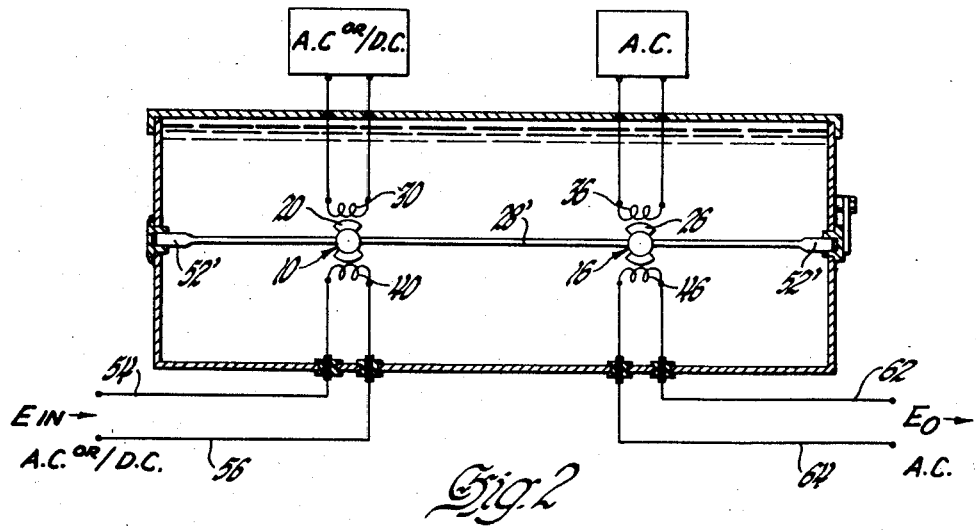
INVENTOR
John E. Shultz
BY
E. W. Chrieter
ATTORNEY

United States Patent Office 2,912,639
Patented Nov. 10, 1959

2,912,639

MICROSYN AMPLIFIER

John E. Shultz, Milwaukee, Wis., assignor to General Motors Corporation, Detroit, Mich., a corporation of Delaware Application November 14, 1955, Serial No. 546,404

7 Claims. (Cl. 323—51)

This invention relates to variable dynamo transformer or microsyn type devices, and has for its general object to provide an arrangement of electromagnetic torque generator and signal generator devices of this character adapted to provide voltage and power amplification of low level electrical input signals.

Such devices are highly precise, electromagnetic mechanisms which are capable of movement only through relatively small angles, transducing low level electrical inputs into precise values of torque and small angular displacements into precise linearly proportional electrical outputs. Information as to their construction and theory of operation is set out in the publication "Microsyn Electromagnetic Components" by R. K. Mueller, December, 1952, published by the Instrumentation Laboratory of the Massachusetts Institute of Technology, Cambridge, Massachusetts.

The invention, both as to its organization and operation will be understood from the following description and drawings in which:

Fig. 1 is a schematic and diagrammatic illustration of an arrangement of microsyn devices in accordance with the present invention; and Fig. 2 is a modification of the apparatus of Fig. 1.

The apparatus shown in Fig. 1 comprises three microsyn devices 10, 12 and 14, the rotors 20, 22 and 24 of which are mounted on a common shaft 28. Each of the devices is also provided with a separate stator having a primary winding 30, 32 and 34 and a secondary winding 40, 42 and 44, respectively, in known manner. In order to reduce their static or residual torque due to friction and other effects, the microsyns are mounted in a liquid filled container 50 filled with a suitable high density, high viscosity fluid with the rotor shaft 28 floated therein. The shaft is suspended by its ends in the container in jewel pivot bearings 52 that serve primarily for centering. Any other means, including a torsional mount as indicated in Fig. 2, could be employed for positioning of the floated shaft, provided that the static friction thereof is low with respect to the torque produced by the signal to be amplified.

The members 10 and 12 may be conventional microsyn torque generators or torque motors, the primary stator windings 30 and 32 of which may be excited from separate sources or from a common source of constant A.C. power. The torques generated by the individual torque devices should vary linearly with input current and should be substantially independent of rotation over the working range of angular displacement.

The member 14 may be a microsyn signal generator or variable transformer device, the primary winding 34 of which is excited from a constant source of alternating current. A common A.C. excitation source may be employed for the primaries of all three devices where the apparatus is used to amplify A.C. signals.

The signal generator has a linear output voltage—displacement characteristic and should also have a very low reaction torque, which may be defined as the torque resulting from angular displacement of the rotor relative to the stator when its primary winding is energized. An ideal signal generator would be one that exhibits substantially constant or preferably no reaction torque, so that it would act only as a transducer from angular rotation to voltage or power.

The secondary winding 40 of the first torque generator 10 is adapted to be connected over input conductors 54, 56 to the voltage source to be amplified. The secondary winding 44 of the signal generator 14 is connected to supply a portion of its electrical power output through an impedance matching device 58 to the secondary winding 42 of the second torque generator 12 and to the system output conductors 62 and 64, as shown.

In operation, with a constant excitation current in the primary stator windings of the three microsyn devices, a signal voltage, Ein, applied to the secondary winding 40 of the first torque generator will cause the latter to produce a torque proportional to the products of the primary and secondary currents, resulting in a rotation of the shaft 28. This rotation creates a proportional voltage at the output terminals of the signal generator and a small reaction torque from the signal generator in opposition to the applied torque of the torque generator. Since the signal generator has a linear relation of output voltage to angular displacement, the power developed thereby will vary linearly with the square of the displacement. A portion of the power from the signal generator is fed back through the load matching network 58 to the secondary winding of the second torque generator, which in turn produces a counter torque in opposition to the initial or the applied torque from the first torque generator microsyn. The system will come to a steady state condition for a given constant amplitude input voltage when the shaft has rotated through some mechanical angle and the applied torque from the torque generator is equal to the counter torque from the signal generator, and the torque from the second or counter torque generator.

With the above described apparatus it is possible to obtain a reasonable torque on the floated shaft from a low level signal input source, such as from a thermocouple, for example, applied to the input of the torque generator. By means of the signal pickoff 14 and the counter torque generator 12, a balance is obtained, torque-wise, so that the shaft will come to rest at a deflection proportional to the applied thermocouple voltage. The output voltage from the signal generator device will then be proportional to the thermocouple voltage applied to the torque generator 10, the ratio therebetween constituting the voltage gain of the system.

Since the apparatus is characterized by very little residual torque by reason of the floated rotor shaft, very minute amounts of power are required to position the shaft. When used in the manner described above, it, therefore, would be possible to obtain voltage gains and power amplification, not in the sense of power generation but in the sense that a vacuum tube amplifies or controls power, the power being supplied from the power source associated with the signal generator. The apparatus thus can be made to fulfill some of the functions normally provided by vacuum tubes and would be suited for use in servo systems.

Since the microsyn system is a very low level amplifier, it would operate well under conditions of vibration, whereas a low level electronic amplifier may be troubled with microphonics. In fact, a slight vibration of the microsyn system would serve to lower the equivalent static torque and thus make it responsible to lower inputs.

A further application for this apparatus is as a D.C. amplifier or remodulator where it is used to convert D.C. signals to proportional A.C. signals. In this application, a D.C. signal would be used on the first torque device, and the second torque device and signal pick-off would be used with A.C. excitation voltages. In this manner A.C. voltage would be received out of the unit when a D.C. signal was applied.

Fig. 2 is a modification of Fig. 1 in which the counter torque generator 12 and the signal generator 14 of Fig. 1 are replaced by a signal generator 16 which is designed to have a reaction torque that varies linearly with angular displacement. The signal generator 16 thus produces the counter torque necessary to balance the applied torque from the torque motor 10 and should be of the order of magnitude as that developed by the torque motor. The system is adapted to perform substantially the same functions as that performed by the apparatus of Fig. 1. As in the case of Fig. 1, the excitation of the signal generator 16 will be A.C. while the torque motor may be excited from A.C. or D.C.

What is claimed is:

1. An electromagnetic transducer of low level input signals comprising in combination, a liquid filled container, a microsyn torque generator device and a microsyn signal generator device each having a rotor, a primary stator winding and a secondary stator winding, a common shaft carrying said rotors floatingly mounted in said container, and means for exciting the primary stator windings of said devices, the secondary stator winding of said torque generator constituting the input of said transducer and the secondary stator winding of said signal generator the output thereof.

2. An electromagnetic transducer of low level input signals comprising in combination, a liquid filled container, a pair of microsyn torque generator devices and a microsyn signal generator device each having a rotor, a primary stator winding and a secondary stator winding, a common shaft carrying said rotors floatingly mounted in said container, means for exciting the primary stator windings of said devices, and means connecting said secondary stator winding of said signal generator to the secondary stator winding of one of said torque generators, the secondary stator winding of the other torque generator constituting the input of said transducer and the secondary stator winding of said signal generator the output thereof.

3. A microsyn amplifier comprising in combination, a liquid filled container, a pair of microsyn torque generator devices and a microsyn signal generator device each having a rotor, a primary stator winding and a secondary stator winding, a common shaft carrying said rotors floatingly mounted in said container, means for exciting the primary stator windings of said devices, and means connecting said secondary stator winding of said signal generator to the secondary stator winding of one of said torque generators, the secondary stator winding of the other torque generator constituting the input of said amplifier and the secondary stator winding of said signal generator the output thereof, said torque generators having substantially linear torque-secondary excitation characteristics and said signal generator having a low reaction torque with respect to the torques produced by said torque generators.

4. A microsyn amplifier comprising in combination, a liquid filled container, a pair of microsyn torque generator devices and a microsyn signal generator device each having a rotor, a primary stator winding and a secondary stator winding, a common shaft carrying said rotors floatingly mounted in said container, means for exciting the primary stator windings of said devices, and load impedance matching means connected between said secondary stator winding of said signal generator and the secondary stator winding of one of said torque generators, the secondary stator winding of the other torque generator constituting the input of said amplifier and the secondary stator winding of said signal generator the output thereof.

5. A microsyn amplifier comprising in combination, a liquid filled container, a pair of microsyn torque generator devices and a microsyn signal generator device each having a rotor, a primary stator winding and a secondary stator winding, a common shaft carrying said rotors floatingly mounted in said container, alternating current supply means for exciting the primary stator windings of said devices, and load impedance matching means connected between said secondary stator winding of said signal generator and the secondary stator winding of one of said torque generators, the secondary stator winding of the other torque generator constituting the input of said amplifier and the secondary stator winding of said signal generator the output thereof, said torque generators having substantially linear torque-excitation characteristics and said signal generator a low reaction torque with respect to the torques produced by said torque generators.

6. A microsyn type direct current amplifier comprising in combination, a liquid filled container, a pair of microsyn torque generator devices and a microsyn signal generator device each having a rotor, a primary stator winding and a secondary stator winding, a common shaft carrying said rotors floatingly mounted in said container, direct current supply source for exciting the primary stator winding of one of said torque generators and an alternating current supply source for exciting the primary stator windings of the other two devices, and load impedance matching means connected between said secondary stator winding of said signal generator and the secondary stator winding of the torque generator whose primary winding is commonly excited therewith, the secondary stator winding of the other torque generator constituting the direct current input terminals of said amplifier and the secondary stator winding of said signal generator the output terminals thereof, said torque generators having substantially linear torque-excitation characteristics and said signal generator having a low reaction torque with respect to the torques produced by said torque generators.

7. An amplifying device comprising a pair of torque motors each having a stator element and a rotor element, an energizing winding on one of the elements of each motor, an angular displacement signal generator having a stator element and a rotor element, an excitation winding on one element of said generator, an output winding on said one element of said generator, one of said motor energizing windings being adapted to receive an input signal to produce a displacement force on the associated rotor element, all of said rotor elements being coupled together for synchronous movement whereby an output signal is developed in said output winding having an amplitude corresponding to displacement of said rotors, said output winding being connected to the other of said motor energizing windings whereby the other of said motors develops a balancing force on said rotor elements.

References Cited in the file of this patent

UNITED STATES PATENTS

| | | |
|---|---|---|
| 1,391,799 | Slocomb | Sept. 27, 1921 |
| 1,589,039 | Anschutz-Kaempfe | Feb. 14, 1923 |
| 1,992,625 | Mathes | Feb. 26, 1935 |
| 2,484,513 | Keller | Oct. 11, 1949 |
| 2,486,641 | Gilbert | Nov. 1, 1949 |
| 2,497,216 | Greennough | Feb. 14, 1950 |
| 2,519,058 | Lundberg et al. | Aug. 15, 1950 |
| 2,660,681 | Horne | Nov. 24, 1953 |
| 2,669,126 | Simmons et al. | Feb. 16, 1954 |
| 2,700,739 | Orlando | Jan. 25, 1955 |